United States Patent
Bennett

(10) Patent No.: US 11,780,411 B2
(45) Date of Patent: Oct. 10, 2023

(54) SPEED REDUCTION POWER UNIT

(71) Applicant: Thomas M. Bennett, Leory, NY (US)

(72) Inventor: Thomas M. Bennett, Leory, NY (US)

(*) Notice: Subject to any disclaimer, the term of this patent is extended or adjusted under 35 U.S.C. 154(b) by 0 days.

(21) Appl. No.: 17/841,772

(22) Filed: Jun. 16, 2022

(65) Prior Publication Data

US 2022/0402465 A1     Dec. 22, 2022

Related U.S. Application Data

(60) Provisional application No. 63/211,538, filed on Jun. 16, 2021.

(51) Int. Cl.
*B60K 6/10*     (2006.01)
*B60T 1/10*     (2006.01)

(52) U.S. Cl.
CPC .................................. *B60T 1/10* (2013.01)

(58) Field of Classification Search
CPC .......... B60T 1/062; B60T 1/10; B60T 13/585; B60T 13/586; B60T 2270/60; B60K 6/10; B60K 6/12; B60K 6/123
See application file for complete search history.

(56) References Cited

U.S. PATENT DOCUMENTS

| | | | | |
|---|---|---|---|---|
| 3,861,487 A | * | 1/1975 | Gill ........................ | B60K 25/10 180/2.2 |
| 4,159,042 A | * | 6/1979 | Jayner ..................... | B60K 6/10 185/40 H |
| 4,632,205 A | * | 12/1986 | Lewis .................... | B60W 20/00 180/2.2 |
| 5,655,617 A | * | 8/1997 | Marshall ................. | B60K 6/10 180/165 |
| 7,789,182 B2 | | 9/2010 | Bradley et al. | |
| 8,851,043 B1 | | 10/2014 | Coney et al. | |
| 9,688,260 B2 | | 6/2017 | Aixala et al. | |

(Continued)

FOREIGN PATENT DOCUMENTS

EP     2821271 A1 *    1/2015     ............... B60K 7/00

OTHER PUBLICATIONS

Machine translation of EP 2821271, retrieved Nov. 10, 2022 (Year: 2022).*

*Primary Examiner* — Bradley T King
(74) *Attorney, Agent, or Firm* — Vincent G. Lotempio; Vincent LoTempio

(57) ABSTRACT

A speed reduction power unit system includes a main power unit operably connected to a vehicle battery and operably connected to a vehicle transmission via a driveshaft. The main power unit includes a primary motor adapted to convert kinetic energy from the transmission to stored electrical potential energy for recharging the vehicle battery. Secondary power units are operably connected to each wheel. Each secondary power unit includes a secondary motor adapted to convert energy to electrical potential energy. The secondary power unit engages to slow the vehicle and generate electrical energy when the vehicle brake is activated. Each secondary power unit is operably connected to the vehicle battery, such that each secondary unit can recharge the vehicle battery. The secondary power units can include internal batteries and may be removable and independently recharged, then reconnected to the system as needed to provide electrical energy to the primary vehicle battery.

8 Claims, 2 Drawing Sheets

(56) References Cited

U.S. PATENT DOCUMENTS

| | | | |
|---|---|---|---|
| 9,731,608 B1 | 8/2017 | Knickerbocker | |
| 2003/0141129 A1* | 7/2003 | Miguel | B60K 17/356 180/242 |
| 2009/0088914 A1* | 4/2009 | Mizutani | B60K 17/356 180/65.265 |
| 2009/0242289 A1* | 10/2009 | Murty | B60W 10/08 475/5 |
| 2010/0193269 A1* | 8/2010 | Fuchtner | B60K 6/40 180/65.21 |
| 2012/0186241 A1 | 7/2012 | Miranda et al. | |
| 2018/0251123 A1* | 9/2018 | Sigmar | H02K 11/33 |
| 2019/0322316 A1* | 10/2019 | Chennupalli | B60K 6/547 |
| 2019/0375305 A1* | 12/2019 | Matt | B60K 1/00 |
| 2020/0112229 A1* | 4/2020 | Yabuta | B60K 7/0007 |
| 2022/0009476 A1* | 1/2022 | Cho | B60K 6/547 |

\* cited by examiner

SPEED REDUCTION POWER UNIT

CROSS REFERENCE TO RELATED APPLICATIONS

This application claims the benefit of U.S. Provisional Application No. 63/211,538 filed on Jun. 16, 2021. The above identified patent application is herein incorporated by reference in its entirety to provide continuity of disclosure.

BACKGROUND OF THE INVENTION

The present invention relates to regenerative power systems. More particularly, the present invention provides a regenerative power system that utilizes different energy storing capabilities in order to extend the operational range of an electric vehicle.

Electric vehicles are quickly becoming more popular as auto manufacturers produce more and more vehicles that rely on renewable energy sources. These electric vehicles are powered via a battery rather than gasoline as with a typical vehicle. The battery drains over time as the vehicle is in use, and must periodically be recharged. One drawback of electric vehicles is that the battery often must be recharged at a power station or with a wall outlet connection. It can be difficult to locate a charging means for the electric vehicle in some cases. In other instances, the battery life is not long enough for particular journeys. When a charging means is located, it often takes a long time to fully recharge the battery, which can be inconvenient. In view of the above, it is desirable to provide an energy generation system for an electric vehicle that stores energy generated by movement of the electric vehicle until it is needed by the main vehicle battery.

Devices have been disclosed in the known art that relate to energy harnessing, battery charging systems for electric vehicles. These include devices that have been patented and disclosed in patent application publications. However, the devices in the known art have several drawbacks. For example, the regenerative braking that most electric vehicles have only increases the battery charge by a small amount as the car slows down. Additionally, other energy storage means such as spring motors, air compressors, or the like are fully integrated into the vehicle and cannot be rearranged or removed to be charged with storable energy outside of the vehicle.

In light of the devices disclosed in the known art, it is submitted that the present invention substantially diverges in functional and design elements from the known art and consequently it is clear that there is a need in the art for an improvement to existing energy regeneration systems for electric vehicles. In this regard the present invention substantially fulfills these needs by providing a speed reduction power unit that converts energy from vehicle operation that otherwise would be lost into stored electrical energy for charging the vehicle's batteries.

SUMMARY OF THE INVENTION

In view of the foregoing disadvantages inherent in the known types of regenerative power systems for electric vehicles now present in the prior art, the present invention provides a Speed Reduction Power Unit, wherein the same can be utilized to provide a mechanism for converting kinetic energy from various aspects of vehicle operation to stored electrical energy for recharging the vehicle's primary battery.

In general, the speed reduction power unit system includes a main power unit operably connected to a vehicle battery and operably connected to a vehicle transmission via a driveshaft, the main power unit comprising a primary motor adapted to convert kinetic energy from the transmission to stored electrical potential energy for recharging the vehicle battery. There may also be a plurality of secondary power units, wherein each secondary power unit is operably connected to each wheel. Each secondary power unit includes a secondary motor adapted to convert wasted braking energy to electrical potential energy, and such energy may be stored in a secondary battery. The secondary power unit engages to slow the vehicle and generate electrical energy when the vehicle brake is activated. Each secondary power unit is operably connected to the vehicle battery, such that each secondary unit can recharge the vehicle battery.

Other objects, features, and advantages of the present invention will become apparent given the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached figures. For the purposes of presenting a brief and clear description of the present invention, the preferred embodiment will be discussed as used for providing a speed reduction power unit system that converts energy from the vehicle's operation to stored electrical energy, in order to extend the operating time of the battery and recharge the battery as needed. The figures are intended for representative purposes only and should not be considered to be limiting in any respect.

Figure 1:
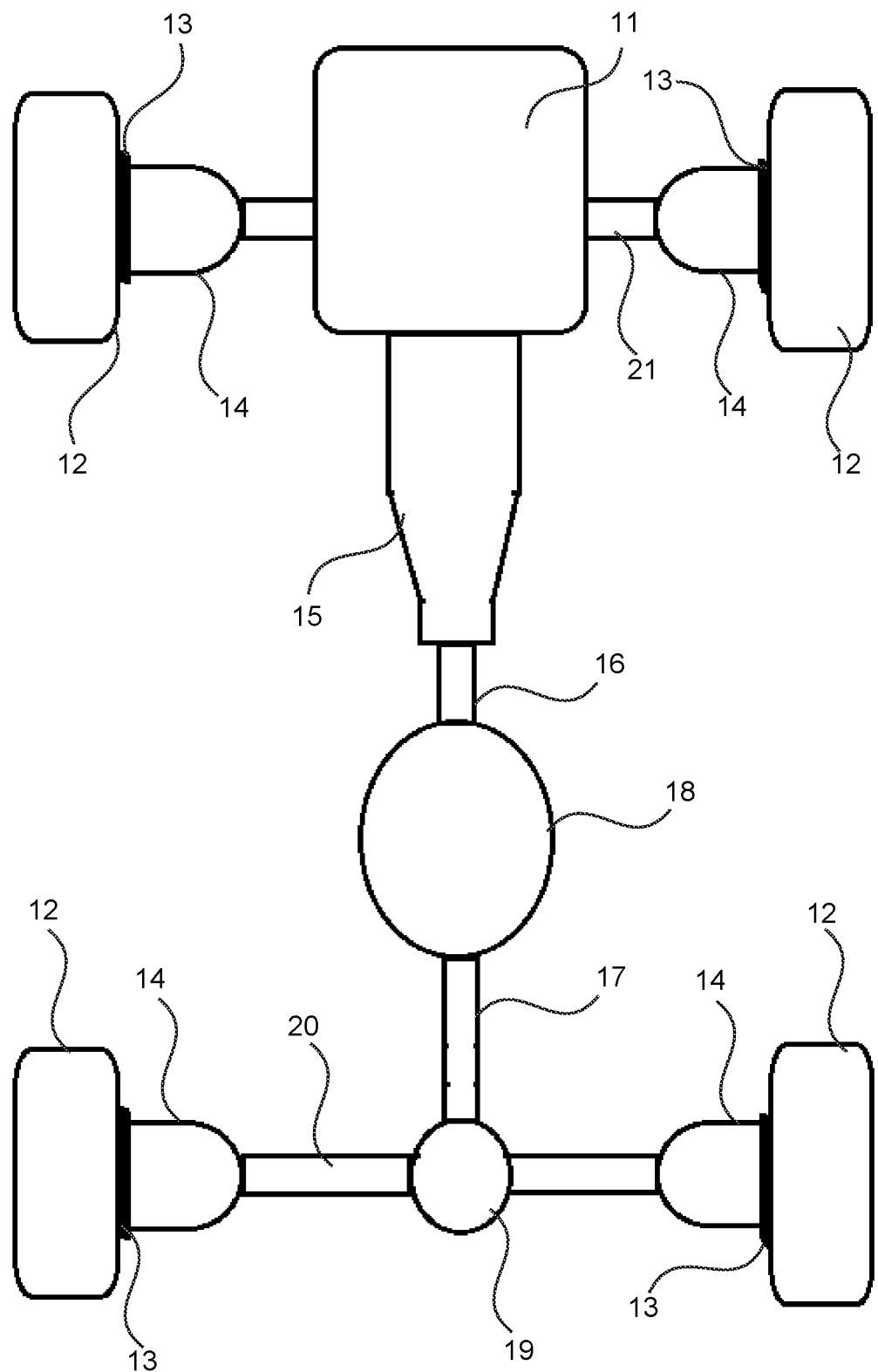
FIG. 1 shows a top down view of a diagram of a vehicle utilizing a first embodiment of the speed reduction power unit system.

Referring now to FIG. 1, there is shown a top down view of a diagram of a vehicle utilizing a first embodiment of the speed reduction power unit system. The system includes a main power unit 18 operably connected to the vehicle battery. In some embodiments, the main power unit 18 is operably connected to the vehicle axle. In the shown embodiment, the vehicle engine 11 is an electric motor with a battery power supply. In the shown embodiment, the main power unit 18 is also operably connected to a transmission 15 vehicle via a driveshaft 16 and to a rear differential 19 via a transfer shaft 17. In some embodiments, the main power unit 18 includes its own transmission. In other embodiments, the main power unit 18 is integrated into the transmission and operably connected to a gearing mechanism that operates when the transmission downshifts.

The main power unit 18 includes a primary motor adapted to convert kinetic energy from the transmission 15 to stored electrical potential energy for recharging the vehicle battery that is part of the vehicle engine 11. In the illustrated embodiment, the main power unit 18 includes a spring motor operably connected to the transmission 15 via a driveshaft 16. In other embodiments, the spring motor is directly integrated with the transmission 15 gearing, such that a specialized transmission 15 with an integrated spring motor can replace a traditional transmission. The main power unit 18 includes a generator, alternator, or similar mechanism. When the driver downshifts, the resulting torque in the transmission 15 winds a spring to store energy. A voltage regulator controls the spring motor to selectively provide energy to the primary vehicle battery as the battery requires it. In other embodiments, other types of power units may be utilized.

The system further includes a plurality of secondary power units 14, wherein each secondary power unit is operably connected to each wheel 12. Each secondary power unit 12 includes a secondary motor adapted to convert wasted energy from braking to electrical potential energy. For example, in the shown embodiment, the secondary motor includes an alternator that converts kinetic energy from braking and can be used to recharge the vehicle battery. The secondary motor is configured to activate when the vehicle brake pedal is depressed, such that the secondary power unit 14 helps to slow the vehicle while simultaneously generating electricity via an alternator.

In some embodiments, the secondary power units 14 include spring motors, such that rotation of the vehicle wheels results in winding of each wheel's spring motor. In some embodiments, the system may further include removable secondary power units 14 having springs that can be manually wound, such that the removable power units 14 can be operably connected to the vehicle battery as needed. The spring motors can be wound manually via a winding mechanism, or may be operably connected to a powered rotational tool or other mechanism for winding the spring motor. After they are sufficiently charged via winding, the spring motors can be resecured within the vehicle system. The secondary spring motors can be utilized to wind the primary motor, or can feed directly to the battery for additional energy storage capabilities. They may also include internal batteries that can be recharged via an alternator when the spring mechanism rotates. These internal batteries can then be coupled to the primary vehicle battery to recharge the primary vehicle battery.

Figure 2:
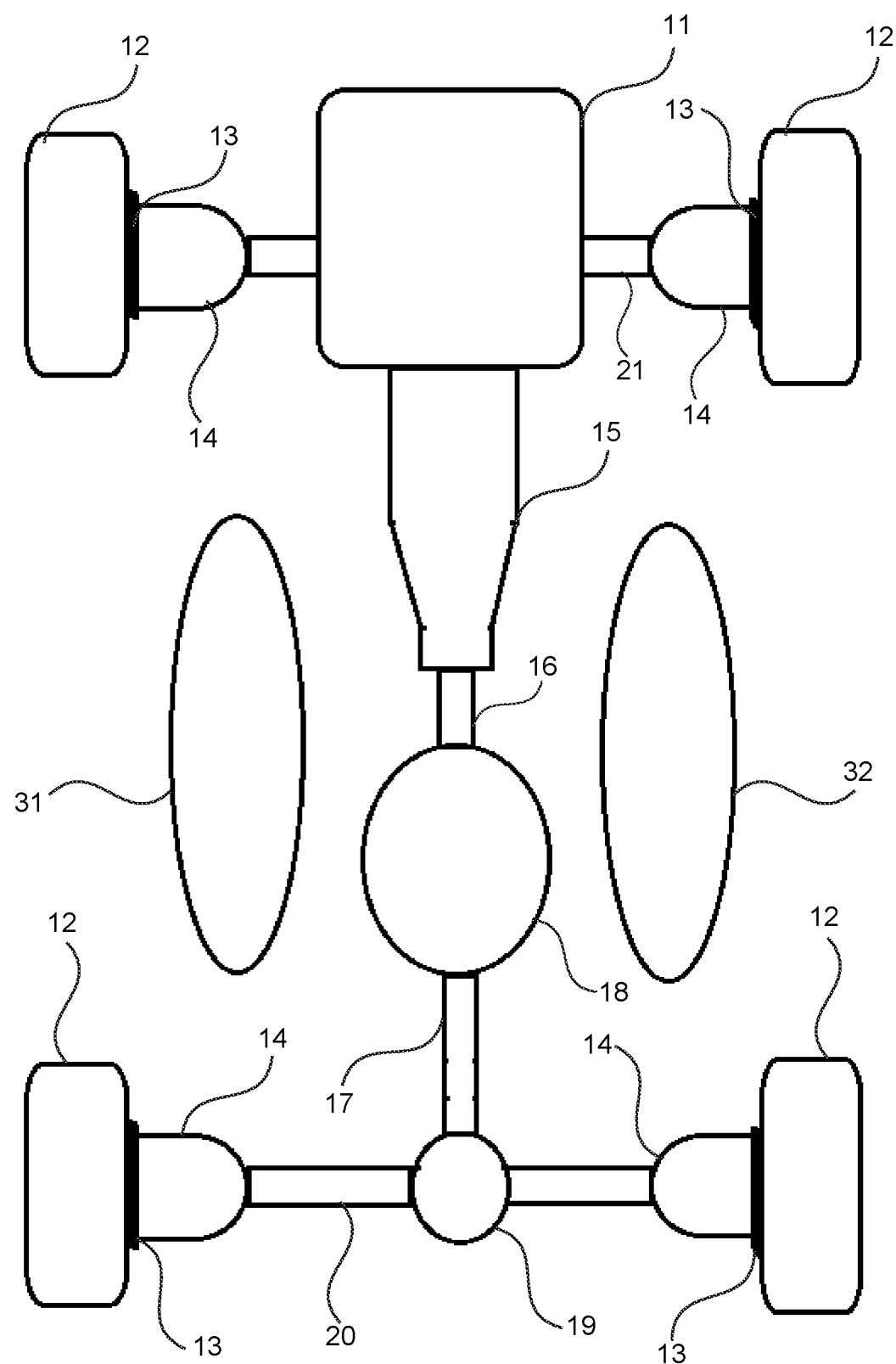
FIG. 2 shows a top down view of a diagram of a vehicle utilizing a second embodiment of the speed reduction power unit system.

Referring now to FIG. 2, there is shown a top down view of a diagram of a vehicle utilizing a first embodiment of the speed reduction power unit system. In this embodiment, the main power unit 18 and secondary power units 14 include air compressors. Each secondary power unit 14 can include its own air tank. The main power unit 18 can include one or more air tanks 31, 32. The main power unit 18 air compressor can be powered via energy from the vehicle transmission 15 operation, or may be powered via a separate pump mechanism. The air tanks 31, 32 can be filled externally via an air supply and a connecting valve. In some embodiments, the air tanks 31, 32 are removable so that they can be detached for filling with air and reattached as needed.

In this embodiment, the main power unit 18 is still operably connected to a transmission 15 via a driveshaft 16, but comprises an air compression mechanism configured to drive a motor via the controlled release of pressurized air. When the driver downshifts, the resulting torque activates a compressor pump, which is configured to compress air within the air compressor motor to store the resulting energy. A voltage regulator controls the air compressor to selectively release a valve of the compressor, which in turn causes an alternator or other generator in order provide energy to the vehicle battery.

The system further includes secondary power units 14 operably connected to each wheel 12. Each secondary power unit includes an independent air compressor motor that can work to add compression to the main power unit 18 or to provide additional power to the vehicle battery. In operation, activation of the vehicle brake will result in compression of air which is stored in a reservoir for later release. The secondary power units 14 can then be secured within the vehicle system to recharge the vehicle battery, thereby extending the operating time and range of an electric vehicle. In some embodiments, the system is fully modular and can utilize secondary power units that consist of spring motors, hydraulic motors, air compression motors, or any combination thereof.

The present invention can also include additional embodiments with different configurations for the main downshifting unit with regard to transmission 15 and the main power unit 18. For example, one embodiment may include a generator directly connected to the main power unit 18, such that the energy from the downshift of the transmission 15 directly powers the generator to produce additional electricity. In other embodiments, such as those where the power units include air compressors, the air tanks may include valves for filling. In some embodiments, some of the air tanks may be removable so that they can be filled externally from the vehicle. The above examples are not intended to be limiting and merely provide a possible configuration for the main 18 and secondary power units 12.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A speed reduction power unit system, comprising:
   a main power unit operably connected to a vehicle battery and operably connected to a vehicle transmission via a driveshaft, the main power unit comprising a primary motor adapted to convert kinetic energy from the transmission to stored potential energy for recharging the vehicle battery, the primary motor including a spring motor operably connected to the transmission wherein a voltage regulator controls the spring motor to selectively provide energy to the vehicle battery;
   a plurality of secondary power units, wherein each of the secondary power units is operably connected to a wheel;
   wherein each of the secondary power units includes a secondary motor that engages when a brake of the vehicle is activated, wherein each of the secondary motors is adapted to convert energy otherwise lost from braking to electrical potential energy;

wherein each of the secondary power units is operably connected to the vehicle battery, such that each of the secondary units can recharge the vehicle battery.

2. The speed reduction power unit system of claim 1, wherein each of the secondary power units is removably secured to the vehicle.

3. The speed reduction power unit system of claim 1, wherein each of the secondary power units includes an internal battery storage that is rechargeable via an external power source.

4. The speed reduction power unit system of claim 1, wherein each of the secondary power units includes a spring motor that is adapted to wind when the vehicle brake is engaged, such that potential energy is stored, and can be controllably released to rotate an alternator to charge a battery.

5. The speed reduction power unit system of claim 1, wherein a generator is directly connected to the main power unit, such that the energy from a downshift of the transmission directly powers the generator to produce additional electricity.

6. The speed reduction power unit system of claim 1, wherein the main power unit includes its own transmission.

7. The speed reduction power unit system of claim 1, wherein the main power unit is operably connected to a vehicle axle.

8. The speed reduction power unit system of claim 4, wherein each of the spring motors of the secondary power units has a manual winding mechanism for winding the spring motor and a power winding mechanism to connect to a powered rotational tool for winding the spring motor.

\* \* \* \* \*